(12) United States Patent
Gula et al.

(10) Patent No.: US 7,748,196 B2
(45) Date of Patent: Jul. 6, 2010

(54) PORTABLE PANEL CONSTRUCTION AND METHOD FOR MAKING THE SAME

(75) Inventors: George Gula, Verona, PA (US); Roger A Clark, Milwaukee, WI (US)

(73) Assignee: Palmer/Snyder Furniture Company, Milwaukee, WI (US)

( * ) Notice: Subject to any disclaimer, the term of this patent is extended or adjusted under 35 U.S.C. 154(b) by 0 days.

(21) Appl. No.: 12/419,127

(22) Filed: Apr. 6, 2009

(65) Prior Publication Data

US 2009/0249723 A1 Oct. 8, 2009

Related U.S. Application Data

(63) Continuation-in-part of application No. 12/142,769, filed on Jun. 19, 2008, which is a continuation of application No. 11/564,075, filed on Nov. 28, 2006, now Pat. No. 7,401,442.

(51) Int. Cl.
*E04C 2/54* (2006.01)
*E04B 2/00* (2006.01)

(52) U.S. Cl. ............... 52/783.1; 52/582.1; 52/582.2; 52/578; 428/116; 428/73; 428/118; 428/327; 428/72

(58) Field of Classification Search ... 52/783.1–783.19, 52/582.1, 582.2, 578; 428/116, 73, 118, 428/327, 72, 60, 76
See application file for complete search history.

(56) References Cited

U.S. PATENT DOCUMENTS

| 2,490,577 | A | 12/1949 | Brown |
| 2,849,758 | A | 9/1958 | Plumley et al. |
| 2,907,127 | A | 10/1959 | Waugh et al. |
| 2,911,274 | A | 11/1959 | Grube |
| 3,310,919 | A | 3/1967 | Bue et al. |
| 3,323,797 | A | 6/1967 | Horton, Jr. |
| 3,450,593 | A | 6/1969 | Fossier et al. |
| 3,512,324 | A | 5/1970 | Reed |
| 3,567,260 | A | 3/1971 | Norris |
| 3,582,447 | A | 6/1971 | Stoiki |

(Continued)

FOREIGN PATENT DOCUMENTS

DE 298 09 543 U1 5/1998

OTHER PUBLICATIONS

Bayer MaterialScience NAFTA—Products—"Baypreg F Composite" webpage Mar. 28, 2007.

(Continued)

*Primary Examiner*—Richard E Chilcot, Jr.
*Assistant Examiner*—Mark R Wendell
(74) *Attorney, Agent, or Firm*—Waddey & Patterson, P.C.; Phillip E. Walker

(57) ABSTRACT

Disclosed herein is a portable panel having numerous favorable characteristics. The panel comprises a core having a length, a width, a first side and a second side. A first fiber layer is attached to the first side while a second fiber layer is attached to the second side. A first polyurethane layer is impregnated in the first fiber layer while a second polyurethane layer is impregnated into the second fiber layer. A first skin is attached to the first polyurethane layer while a second skin is attached to the second polyurethane layer. The panel can be used in the manufacture of tables, flooring, risers, stages, bleachers, and the like.

24 Claims, 17 Drawing Sheets

U.S. PATENT DOCUMENTS

| | | |
|---|---|---|
| 3,630,813 A | 12/1971 | Allen |
| 3,676,279 A | 7/1972 | Beaver |
| 3,826,056 A | 7/1974 | Smith et al. |
| 3,868,297 A | 2/1975 | Jamison et al. |
| 3,982,057 A | 9/1976 | Briggs et al. |
| 4,144,681 A | 3/1979 | Leffler et al. |
| 4,353,947 A | 10/1982 | Northcutt |
| 4,411,118 A | 10/1983 | Claver |
| 4,522,284 A | 6/1985 | Fearon et al. |
| 4,603,531 A | 8/1986 | Nash |
| 4,645,171 A | 2/1987 | Heide |
| 4,680,216 A | 7/1987 | Jacaruso |
| 4,879,152 A | 11/1989 | Green |
| 4,931,340 A | 6/1990 | Baba et al. |
| 4,973,508 A | 11/1990 | Bretz |
| 4,988,131 A | 1/1991 | Wilson et al. |
| 5,006,391 A | 4/1991 | Biersach |
| 5,061,541 A | 10/1991 | Gertel |
| 5,070,662 A | 12/1991 | Niese |
| 5,154,963 A | 10/1992 | Terry |
| 5,288,538 A | 2/1994 | Spears |
| 5,348,778 A | 9/1994 | Knipp et al. |
| 5,496,610 A | 3/1996 | Landi et al. |
| 5,569,508 A | 10/1996 | Cundiff |
| 5,626,157 A | 5/1997 | Galpin et al. |
| 5,634,309 A | 6/1997 | Polen |
| 5,667,866 A | 9/1997 | Reese, Jr. |
| 5,776,582 A | 7/1998 | Needham |
| 5,888,612 A | 3/1999 | Needham et al. |
| 5,947,037 A | 9/1999 | Hornberger et al. |
| 5,972,468 A | 10/1999 | Welch et al. |
| 5,992,112 A | 11/1999 | Josey |
| 6,061,993 A | 5/2000 | Bendixen et al. |
| 6,117,518 A | 9/2000 | Cawse et al. |
| 6,128,881 A | 10/2000 | Bue et al. |
| 6,189,283 B1 | 2/2001 | Bentley et al. |
| 6,227,515 B1 | 5/2001 | Broyles |
| 6,235,367 B1 | 5/2001 | Holmes et al. |
| 6,253,530 B1 | 7/2001 | Price et al. |
| 6,446,413 B1 | 9/2002 | Gruber |
| 6,455,131 B2 | 9/2002 | Lopez-Anido et al. |
| 6,505,452 B1 | 1/2003 | Hannig et al. |
| 6,526,710 B1 | 3/2003 | Killen |
| 6,743,497 B2 | 6/2004 | Ueda et al. |
| 6,753,061 B1 | 6/2004 | Wedi |
| 6,761,953 B2 | 7/2004 | Haas et al. |
| 6,769,218 B2 | 8/2004 | Pervan |
| 6,837,171 B1 | 1/2005 | Clark et al. |
| 6,865,856 B2 | 3/2005 | Kim et al. |
| 6,913,667 B2 | 7/2005 | Nudo et al. |
| 7,197,852 B2 | 4/2007 | Grillos |
| 2006/0003155 A1 | 1/2006 | Stewart |
| 2006/0204714 A1 | 9/2006 | Wang et al. |

OTHER PUBLICATIONS

Cageao, Ronald A., Bayer MaterialScience LLC, "Studies of Composites Made With Baypreg F: Component Selection For Optimal Mechanical Properties," Polyurethanes 2004, Oct. 18-20, 2004.

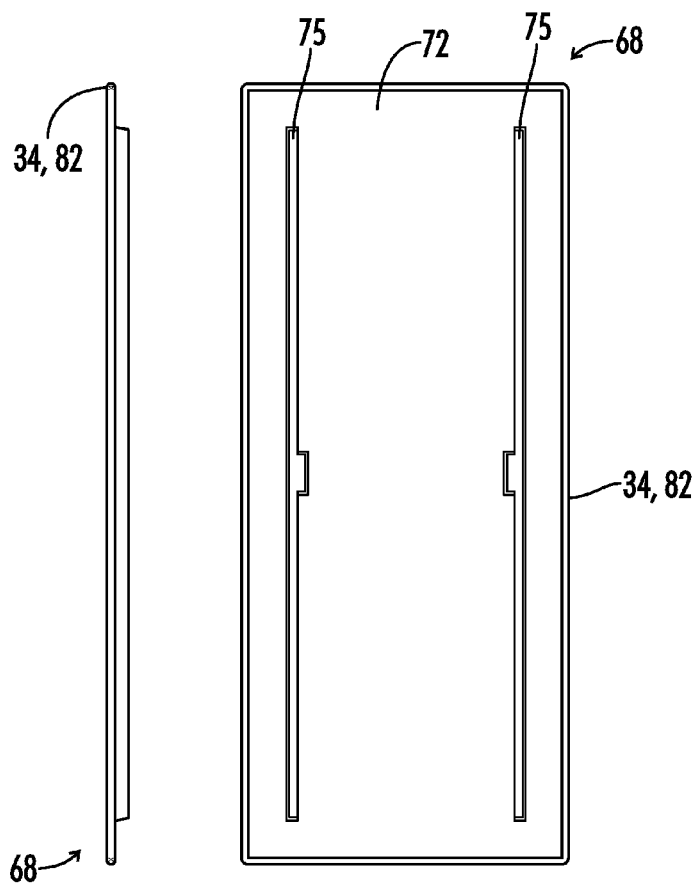
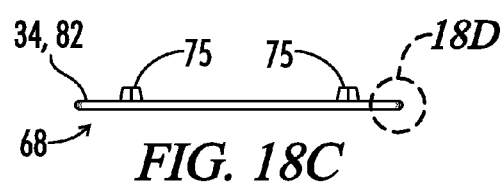
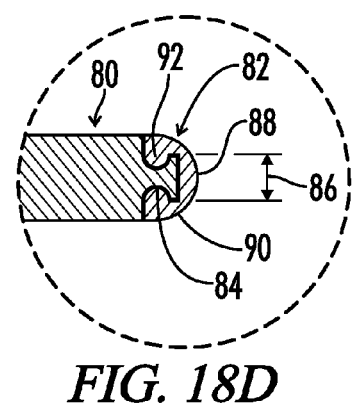
FIG. 18A  FIG. 18B
FIG. 18C
FIG. 18D

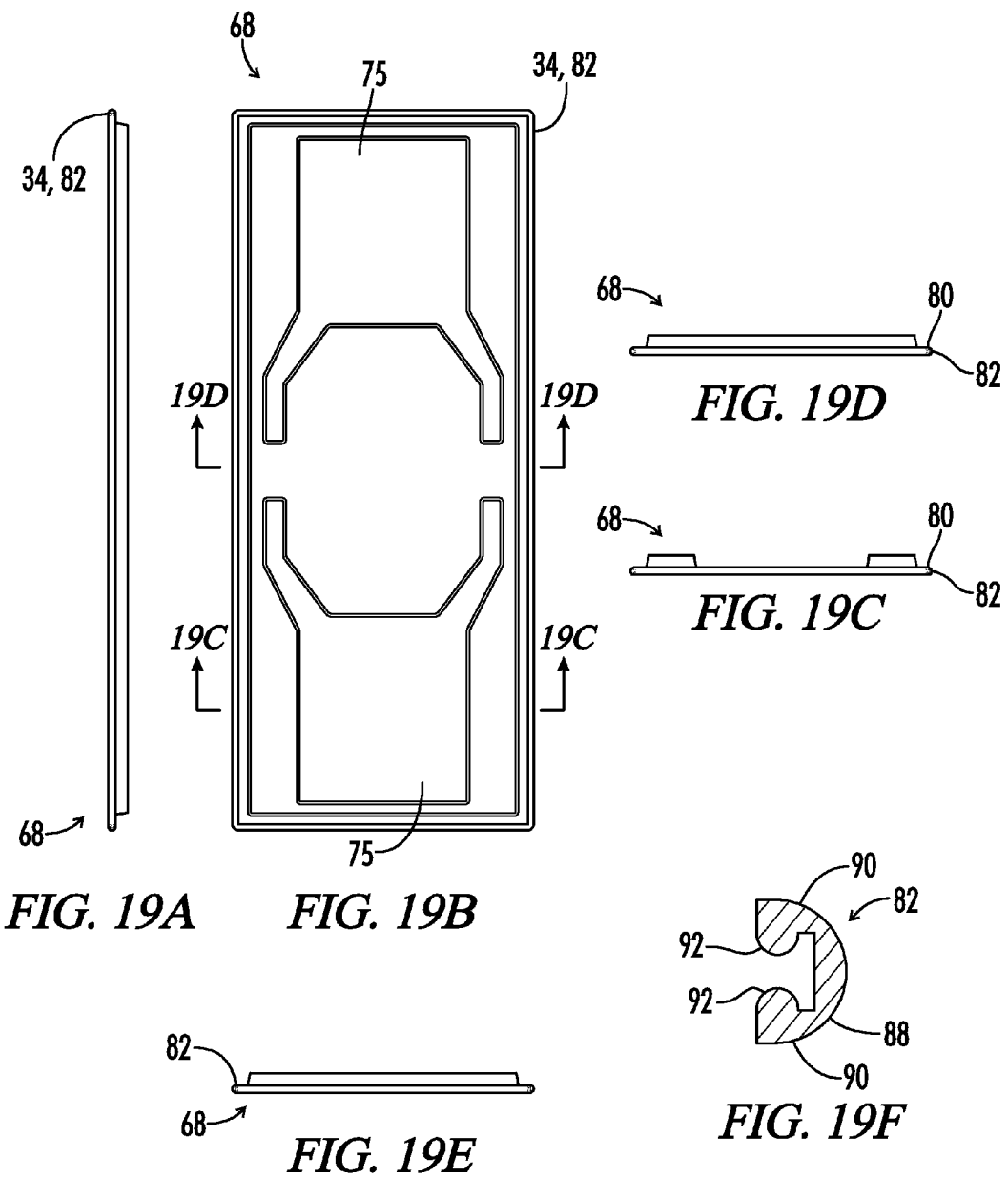

PORTABLE PANEL CONSTRUCTION AND METHOD FOR MAKING THE SAME

CROSS-REFERENCES TO RELATED APPLICATIONS

This application is a Continuation-in-part application claiming the benefit of co-pending U.S. patent application Ser. No. 12/142,769 filed Jun. 19, 2008, entitled "New Portable Panel Construction and Method for Making the Same", which claims benefit of U.S. patent application Ser. No. 11/564,075 filed Nov. 28, 2006, entitled "New Portable Panel Construction and Method for Making the Same", and issued as U.S. Pat. No. 7,401,442 on Jul. 22, 2008, both of which are hereby incorporated in their entireties.

A portion of the disclosure of this patent document contains material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

The present invention relates to an improved panel. More specifically, without limitation, this invention relates to a panel made for use in portable flooring, folding tables, risers/platforms/event staging, and wall partitions.

There are numerous industries that use portable equipment and items in the preparation and production of events associated with those industries. The portable equipment used in and at these events are typically assembled and/or positioned prior to the event and removed after the event to allow alternate uses and/or different arrangements of the event venues. Examples of types of equipment that are assembled, moved and/or positioned during these events include portable flooring (such as dance floors, tent floors, stadium floors, etc.), folding tables, bench seating, event platforms/risers/staging, walls, and wall partitions.

For each of these various pieces of equipment, one of the general desirable characteristics is a generally planar shaped surface on which people and/or items will walk, stand, or are placed. Other desirable characteristics include high surface and structural durability, light weight, ease of assembly and disassembly, water resistant, various aesthetic patterns, images, and/or colors on the planar surfaces, and cost effective equipment pieces. To this end there have been numerous attempts in the art to construct various portable tables, portable floors, and the like. Examples of these attempts include U.S. Pat. Nos. 2,490,577, 2,849,758, 2,907,127, 2,911,274, 3,310,919, 3,323,797, 3,450,593, 3,512,324, 3,567,260, 3,582,447, 3,630,813, 3,676,279, 3,826,056, 3,868,297, 4,144,681, 4,353,947, 4,522,284, 4,645,171, 4,680,216, 4,879,152, 4,931,340, 4,973,508, 4,988,131 5,006,391, 5,070,662, 5,061,541, 5,154,963, 5,288,538, 5,348,778, 5,496,610, 5,569,508, 5,626,157, 5,634,309, 5,667,866, 5,776,582, 5,888,612, 5,947,037, 5,972,468, 5,992,112, 6,061,993, 6,117,518, 6,128,881 6,189,283, 6,227,515, 6,235,367, 6,253,530, 6,446,413, 6,445,131, 6,505,452, 6,526,710, 6,743,497, 6,753,061, 6,761,953, 6,837,171 and 6,865,856. These patents are directed at various designs for tables, panels, locking mechanisms, portable flooring and the like. These patents use less than ideal methods to construct the substantially planar surfaces and connect these surfaces.

For example, in the portable flooring industry conventional flooring panels and the methods for making the same have several drawbacks. One type of typical conventional construction includes using oriented strand board or plywood cut to a preferred size from a large blank as the core structure. The perimeter of this core is machined to provide a contour to accept an edge and the core is coated on one side with a protective film for moisture protection. An edge structure is cut to a desired length and machined to facilitate assembly to the core. Then vinyl or wood parquet tiles are manually placed with adhesive glue onto one of the planer surfaces and then pressed and cured for somewhere between six to eight hours. The excess glue is cleaned off and the locking hardware is attached around the exterior.

An alternate conventional method of making the panels includes cutting a foam core to the preferred size and machining it to provide space for the locking hardware. Steel skins are cut and sized to fit over the foam and are glued to the foam core. A laminate skin is glued to the steel skin and then the panel is pressed and cured. Then the panel is placed into a mold wherein an elastomer edging is molded around the panel perimeter. The locking hardware is installed once the panel is removed from the mold.

Both of these conventional methods result in either very heavy panels that are difficult to transport or panels susceptible to water damage. Both of these methods are labor intensive, while the show surfaces, or show skins, of these panels are susceptible to glue failure rendering these panels disfigured and/or unusable.

The conventional panels and tables include other deficiencies. These include the susceptibility of these panels and tables to damage, especially along the edges, when the panels are in transit or even in use. The prior art panels and tables lack an edging that can both hold the surfaces together and provide significant shock-absorption capability. Additionally, one category of conventional tables lack sound absorption features. They are also heavy thus lacking portability and they do not stack well or compactly thus lacking storability.

What is needed then is a new panel and method for making the same that combines a light weight and durable construction for easy and convenient transport together with the ability to withstand the adverse affects of water and prolonged product life in use. The preferable panel is manufactured with more cost effective, less labor intensive methods to make the panel affordable to a broad cross-section of the market. This needed panel is lacking in the art.

BRIEF SUMMARY OF THE INVENTION

Disclosed herein is a portable panel having numerous favorable characteristics. The panel comprises a core having a length, a width, a first side and a second side. A first fiber layer is attached to the first side while a second fiber layer is attached to the second side. A first polyurethane layer is impregnated in the first fiber layer while a second polyurethane layer is impregnated into the second fiber layer. A first outer skin is attached to the first polyurethane layer while a second outer skin is attached to the second polyurethane layer. Each of these steps can take place individually then the composite is placed into a press for a cure cycle.

Also disclosed is a portable table comprising support legs and a planar surface attached to the support legs. The planar surface includes a core having first and second fiber layers attached on first and second sides of a core. First and second polyurethane layers impregnate the first and second fiber layers, respectively, while first and second outer skins are attached to the first and second polyurethane layers, respectively. Each of these steps can take place individually then the composite is placed into a press for a cure cycle.

Also included is a portable table wherein legs connect to a panel through a structure that is mounted within a lightweight core of the panel.

Also included is a portable floor comprising a plurality of panels. Each panel includes a core having first and second sides. The first side has an attached first fibered layer impregnated by a first polyurethane layer and a first skin attached to the first polyurethane layer. Attached to the second side of the core is a second fiber layer impregnated with a second polyurethane layer having a second skin attached to the second polyurethane layer. A frame surrounds the core wherein the frame includes two male sides and two female sides. The female sides include an engaging location and a channel having a channel length substantially equal to the core length. The male sides include a protrusion shaped to engage the channel and a locking mechanism. The protrusion has a protrusion length substantially equal to the channel length.

Also included is a method of constructing a panel. The method comprises providing a core, attaching a first fiber layer to the first side of the core, and attaching a second fiber layer to the second side of the core. The method further includes impregnating first and second polyurethane layers into the first and second fiber layers, respectively, and preferably immediately attaching a first skin to the first polyurethane layer and a second skin to the second polyurethane layer. The entire composite is then placed in a press where it cures for a period.

Also included is a method of preventing lateral panel movement when a floor is assembled. The panels are secured together by the cam locks which are located in the male extrusion lengths. The method used to prevent the panels from sliding laterally is accomplished with apertures located on the male side in the section cutout for the lock to receive two protruding pieces, such as cap head screws, located on the female side.

The integration of light weight panel technology into a series of products with specific advantages in production and use is taught with this disclosure. The inventive panels relate generally to a process of polyurethane construction using combinations of fiber layers arrayed on both sides of a light weight core material with external skins bonded integrally to the polyurethane layers. The various layers can be bonded to both sides of the panel through the polyurethane polymerization process.

Advantages of the panels of the current invention, as compared to those of the prior art, include a water resistant characteristic and a lighter weight panel that facilitates transportation and assembly. The current invention can have a reversibility option with multiple patterns, designs and/or color options on the opposing sides. The various layers and skin have superior adhesion due to the impregnation and attachment of the skins during the curing process and the superior adhesive characteristics of polyurethane. The inventive panels have a substantial labor saving cost and specifically do not require a mold for their construction. This is an advantage since the use of a mold can severely restrict the economics of producing large panels and requires significant capital investment for the molds and presses. A mold also requires cleaning and maintenance both of which add to cost and time for the production of the panels. As such, the elimination of the use of a mold in panel construction can greatly reduce the production time and increase cost savings during the production of the inventive panels.

For example, the molds discussed in some of the prior art, namely U.S. Pat. No. 6,761,953 use an open mold containing the outer layer and optionally the decorative layer. The prior art fails to place the layers on to the composite materials outside of a press and without a mold. The production of the current inventive panels is facilitated by the flat geometry of the parts and the use of a pre formed perimeter enclosure, such as aluminum or elastomer edging. The elastomer edge can provide part shape opportunities that are not possible with extrusion.

Additionally, the inventive panels can be approximately 30% thinner than the existing panels which can enhance the safe use and operation of the panel. For example a thinner panel reduces the likelihood of trips and falls caused by the thickness of the panels when laid flat and used in a portable flooring embodiment. Additionally, the exterior surfaces on the inventive panels are superior in terms of wear, durability, and maintenance thereof. Additionally the panel lateral movement suppression system is a unique, cost effective, and practical method to prevent the panels from sliding when engaged.

Other advantages include the portable, stackable, storable nature of the lightweight table. As compared to other tables currently in use, the currently disclosed inventive table can withstand edge abuse, facilitate stacking more inventive tables in a smaller space and allow inventive tables to be stacked flat against each other. For example, conventional cocktail table tops have a connection plate that mounts beneath the table top. This connection plate substantially prevents the conventional tops from being securely stacked. The current inventive table having a connection plate mounted within the core as an integral part of the core results in a flat panel that can be stacked in a very efficient manner.

The inventive panels can have various applications in numerous industries. These industries include hospitality and entertainment industries such as: hotel, recreation centers, banquet halls, conference centers, stadiums, schools, outdoor activities with and without tents, and other similar facilities/locations. For example, portable flooring made in accordance with the current inventive panels can be set up and used indoors or outdoors with minimal assembly and disassembly time. These inventive panels facilitate these applications due to their strength, durability, water resistant nature, light weight, and positive interconnection between adjacent panels. For example, dance floors, tent floors, stage floors or other portable flooring applications can be ideally made using the inventive panels. Flooring so made can include a perimeter composed of an elastomer or extruded metal framework using tongue and groove profiles for panel interconnection. Alternately at least one of the sides can be shaped to interact with supporting feet and/or legs used to facilitate the upright placement of the panels, such as in a wall configuration.

It is therefore a general object of the present invention to provide an improved panel.

Another object of the present invention is to provide a method for making an improved panel.

Still another object of the present invention is to provide an improved panel that can be used in the making of a portable floor, folding tables, risers, event staging, and wall partitions.

Another object of the present invention is to provide portable flooring system having a lateral movement suppression mechanism positioned to restrict movement of panels relative to adjacent panels in the portable flooring system.

Still another object of the present invention is to provide a panel having multiple show surfaces that can vary in appearance, design, texture, color, and the like.

Yet another object of the present invention is to provide a panel and/or portable table that facilitate its mobility while maintaining a satisfactory level of stability when in use.

Another object of the present invention is to provide a panel and/or portable table having an edging that can both hold the surfaces together and provide significant shock-absorption capability.

Still another object of the present invention is to provide a panel and/or portable table that includes sound absorption features.

Yet another object of the present invention is to provide a panel and/or portable table that have the ability to be stacked flat so as to take up less space when not in use and still maintain a desired level of stability when in use.

Another object of the invention is to provide a lightweight panel wherein legs connect to a panel through a structure that is mounted within a lightweight core of the panel.

Other and further objects, features and advantages of the present invention will be readily apparent to those skilled in the art upon reading of the following disclosure when taken in conjunction with the accompanying drawings.

BRIEF DESCRIPTION OF THE SEVERAL VIEWS OF THE DRAWINGS

FIG. 18A is a side view of a table top made in accordance with the current disclosure.

FIG. 18B is a bottom view of the table top show in 18A.

FIG. 18C is a partial cross-section of the table top show in 18A.

FIG. 18D is a detailed partial cross-section view of the circled area shown in 18C.

FIG. 19A is a side view of a table top made in accordance with the current disclosure.

FIG. 19B is a bottom view of the table top show in 19A.

FIG. 19C is a cross-sectional view of the table top show in 19B taken along line A-A.

FIG. 19D is a cross-sectional view of the table top show in 19B taken along line B-B FIG. 19E is an end view of the table top shown in 19A.

FIG. 19F is a detailed cross-section view of an example of a frame around the table shown in 19A-E.

DETAILED DESCRIPTION OF THE INVENTION

Referring generally to FIGS. 1-22C, a panel is shown and generally designated by the numeral 10. The panel 10 has many uses and can be used in conjunction with a portable floor, as seen in FIGS. 1-12, a portable table, as shown in FIGS. 13, 14 and 18-22C, risers, bleachers event staging, walls, and the like.

Figure 1:
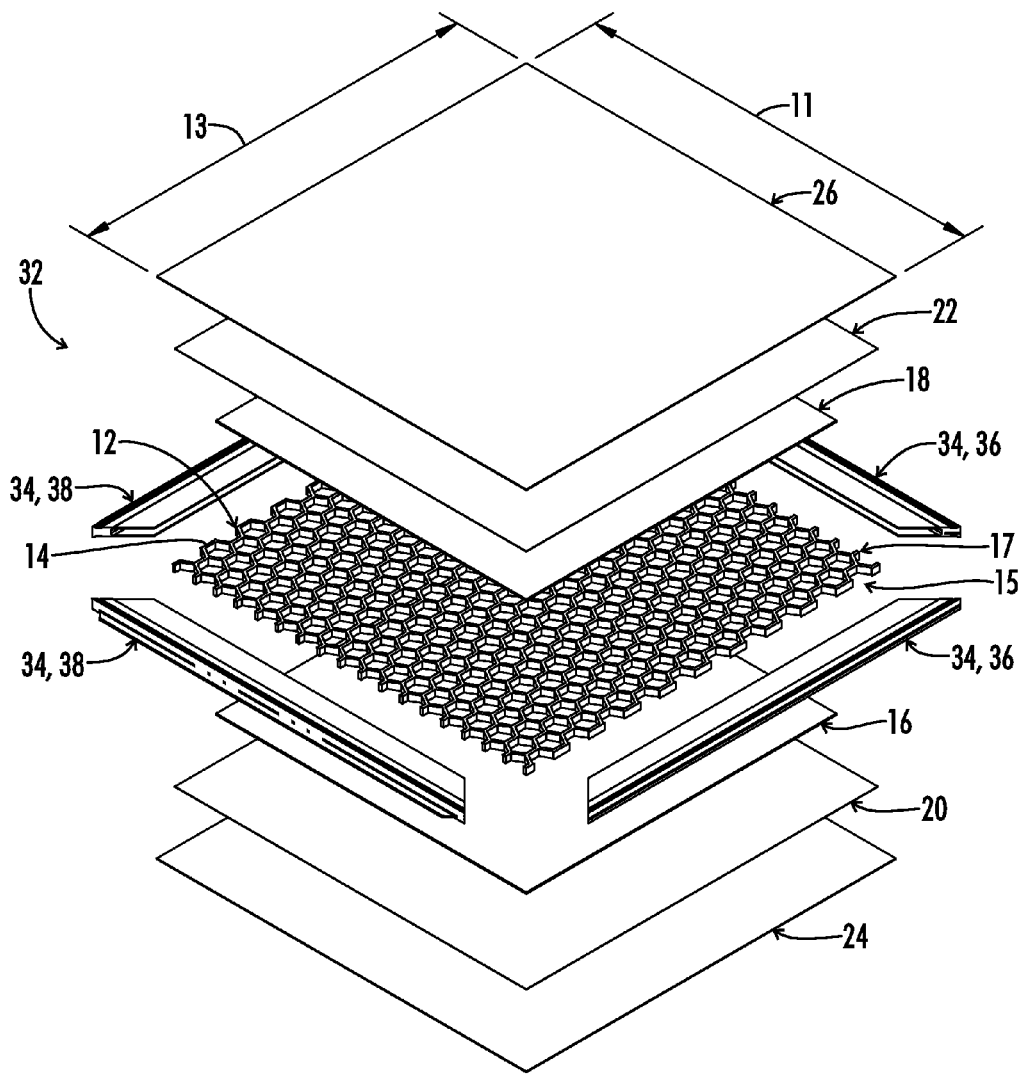
FIG. 1 is an expanded perspective view of a panel made in accordance with the current disclosure and used in connection with portable flooring.
Figure 13:
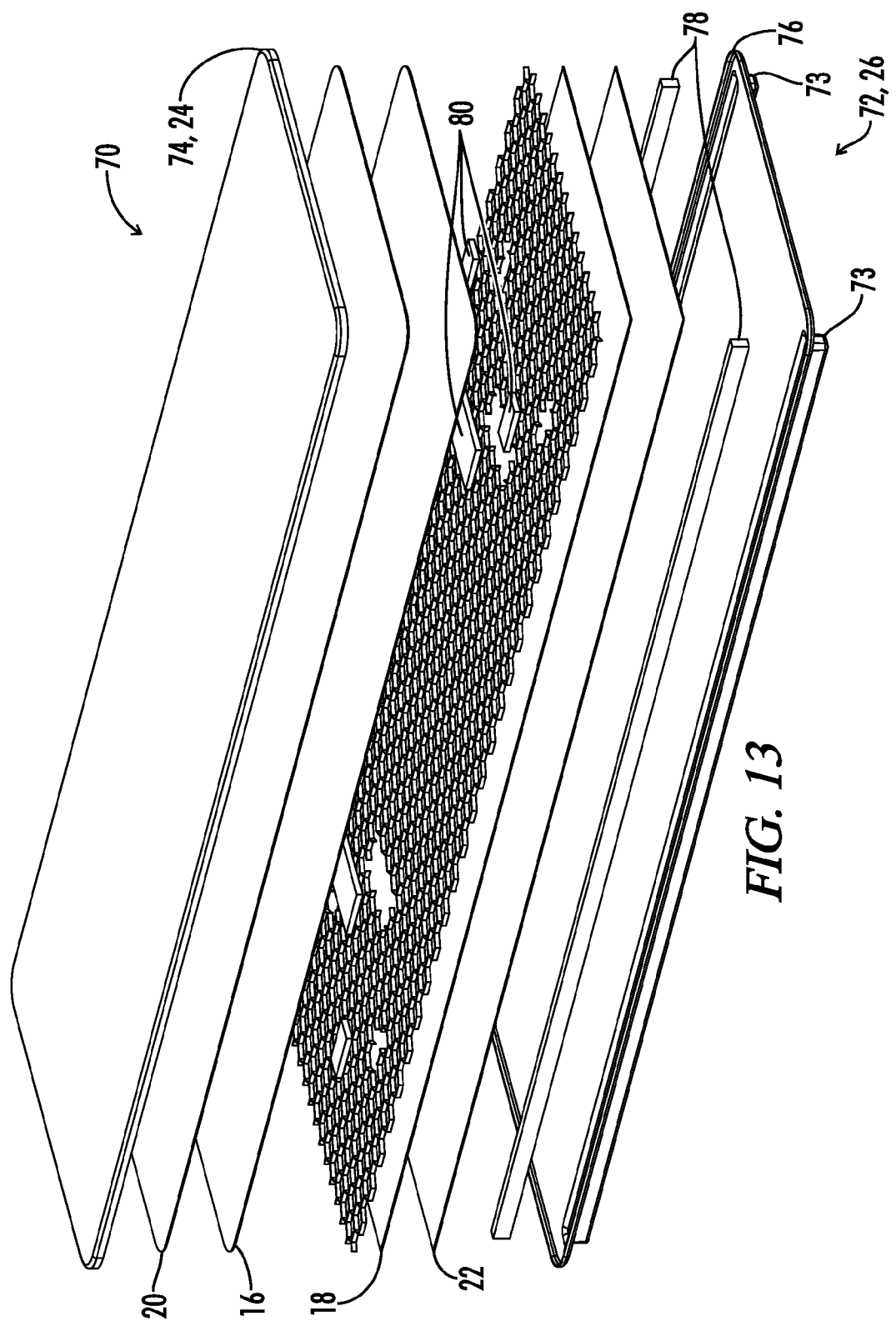
FIG. 13 is an expanded perspective view of a table top made in accordance with the current disclosure.
Figure 14:
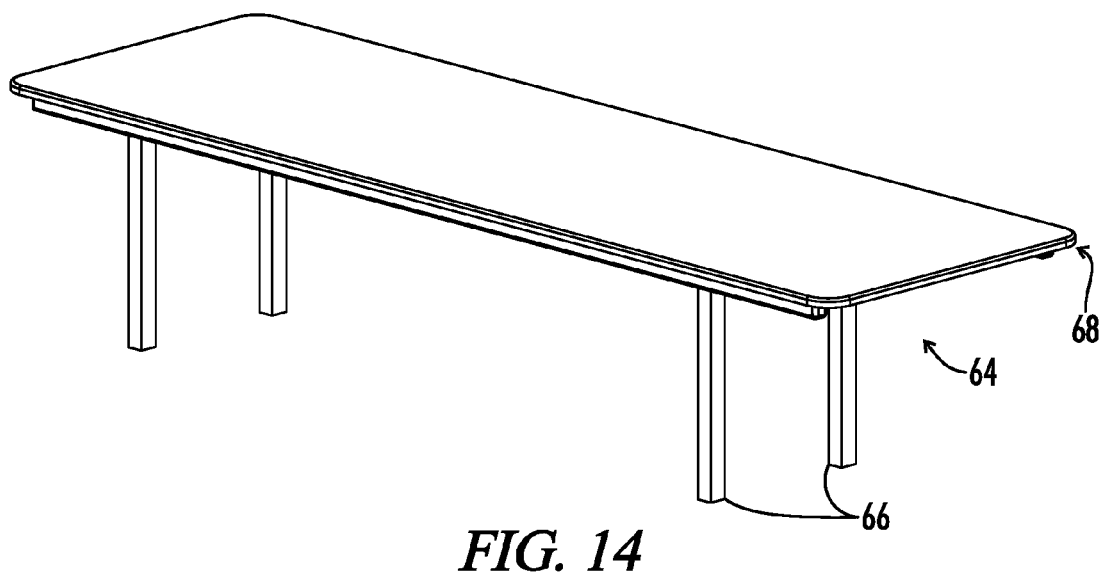
FIG. 14 is a perspective view of a portable table made in accordance with the current disclosure.

The panel 10 will have a core 12. The core can be made from many materials including paper honeycomb, plastic honeycomb, polyurethane, EPS, wood, metal, and the like. The core can preferably include a plurality of openings 14 wherein the openings are substantially uniformly spaced along the width 11 and length 13 of the core. The openings 14 can be honeycomb in shape as best seen in FIGS. 1 and 13.

First and second fiber layers 16 and 18 are attached to the first and second sides 15 and 17 of the core 12. First and second polyurethane layers 20 and 22 impregnate first and second fiber layers 16 and 18 respectively. First and second skins 24 and 26 are attached to the first and second polyurethane layers 20 and 22, respectively.

The first and second skins 24 and 26, which can also be first and second laminate skins, are attached to the polyurethane layers before the polyurethane layers dry. This creates a strong bond between the skins and the polyurethane layers to increase the durability and attachment thereto. Additionally the impregnation of the polyurethane layers through the fiber layers increases the strength and bonding of the polyurethane layers and skin to the fiber layers and a core upon which they are attached. Prior to application of the polyurethane the fiber layers 16 and 18 are attached to the core 12. For example, staples, glue or other fastening systems known in the art to attach fiber layers to a core layer can be used.

Panels constructed in accordance with this disclosure have many benefits including exhibiting a light weight and a high strength for a given cross section, especially in view of prior art panels. The current inventive panels also include an option for the addition of strengthening ribs and/or edges to the design. Additionally an integral column mount or leg support structure can be mounted within the lightweight core. Many surface finishes are possible including, but not limited to leather, laminate, vinyl, spray polyurethane, wood grain, texture and color variances, such as the use of various paints. Additionally various patterns and/or designs can be incorporated into the skins 24 and 26. These variances can be realized through the type of skin 24 and 26 that is bonded in with the polyurethane layers 20 and 22 around the fiber layers 16 and 18 and a core 12. Additionally an ultraviolet protective coating can be added if desired. Panels so constructed are also water resistant and have an increased durability for a wide range of uses.

The first and second skins 24 and 26 can comprise sound attenuating or sound absorbing material. For example one or both of the skins 24 and 26 could include sound attenuating material. In a preferred embodiment, the second skin 26 covers the bottom portion of a table and comprises fabric, such as cloth. This type of second skin can deaden sound and is less likely to abrasively engage something sliding under the table, such as the clothing or body parts of a person sitting, or seated, at the table. This selection of the sound attenuating material can provide a noticeable sound difference in a room filled with such tables.

The first and second skins 24 and 26 can comprise a metal portion that extends substantially the width 11 and length 13. This laminate/metal skin composite can be placed over the wet polyurethane and fiberglass as described above. This laminate/metal skin composite helps to prevent warping caused by expansion and retraction of the laminate that is associated with changing environmental conditions. For example, the inward forces on a 48 inch by 48 inch panel were calculated to be 10,000 lbs when the laminate dries out. The metal skin can prevent the laminate from moving and prevent warping of the panel 10.

One example of an item in which an inventive panel can be used is in the production of a portable floor. The portable floor 30 includes a plurality of floor panels 32 that include the core 12, fiber layers 16 and 18, polyurethane layers 20 and 22, and skins 24 and 26 as previously discussed. Additionally, each panel includes a frame 34 surrounding the core 12. The frame 34 preferably includes two (2) female sides 36 and two (2) male sides 38. The female side 36 includes a lock engaging section 41, and a channel 42 having a channel length 44 substantially equal to the core length 13. The female side 36 is extruded such that it can directly engage the protrusion 46. The male side 38 includes the protrusion 46 shaped to engage the channel 42 and a locking element 48. The protrusion 46 has a protrusion length 50 substantially equal to the channel length 44.

Figure 2:
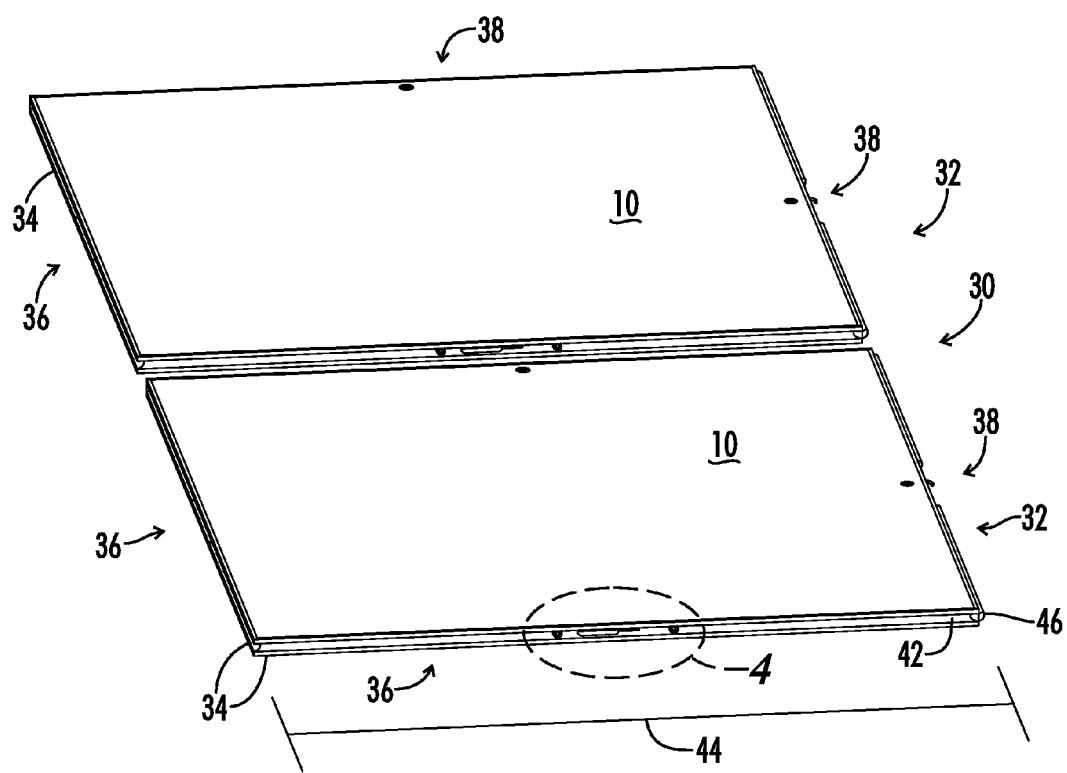
FIG. 2 is a top perspective view of portable flooring made in accordance with the current disclosure.
Figure 3:
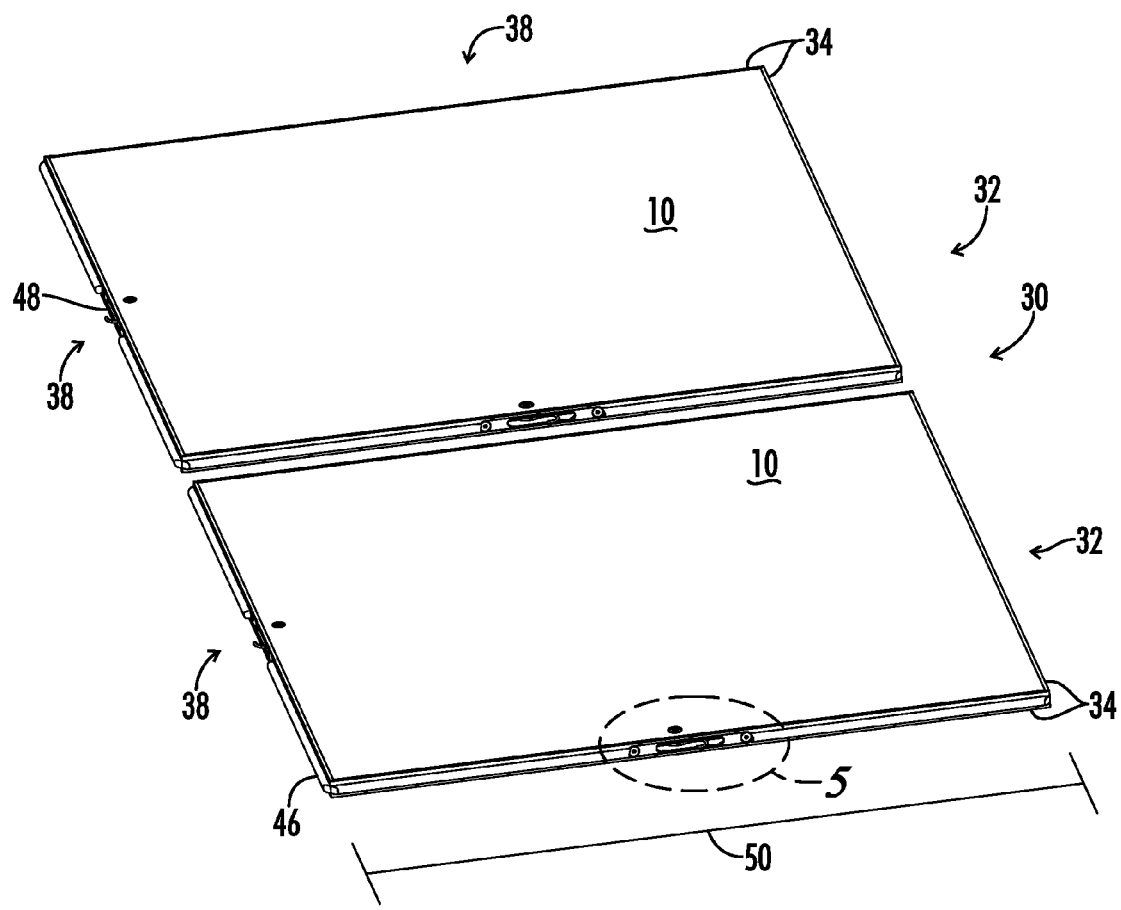
FIG. 3 is a bottom perspective view of FIG. 2.
Figure 4:
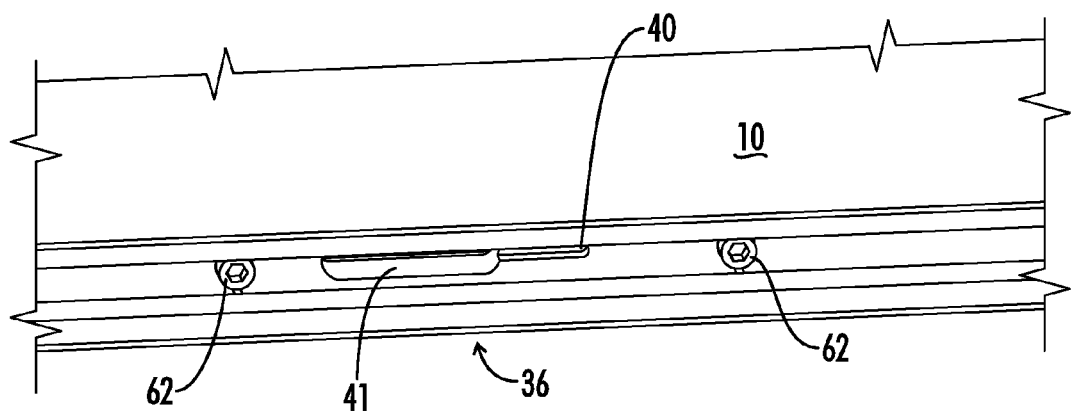
FIG. 4 is a detail view of the area circled and labeled as 4 in FIG. 2.
Figure 5:
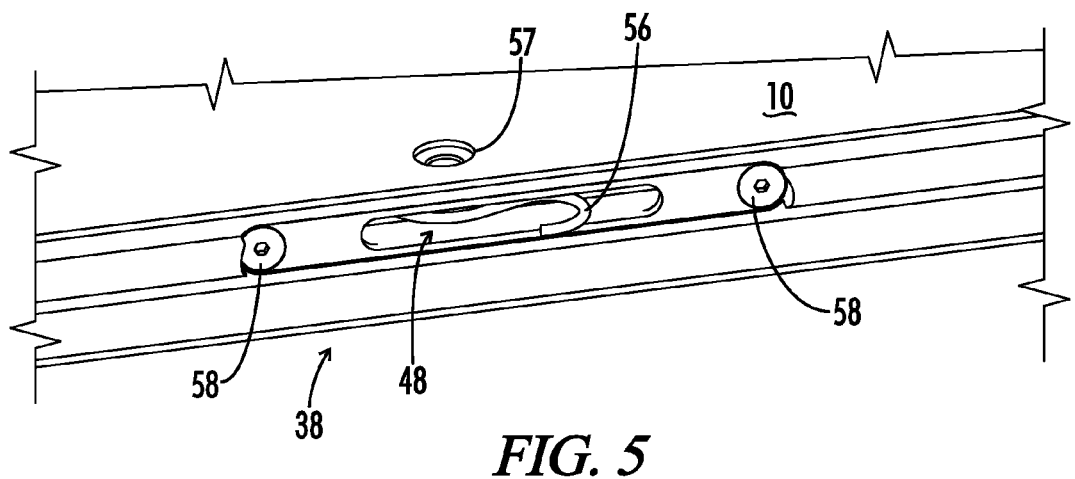
FIG. 5 is a detail view of the area circled and labeled as 5 in FIG. 3.
Figure 6:
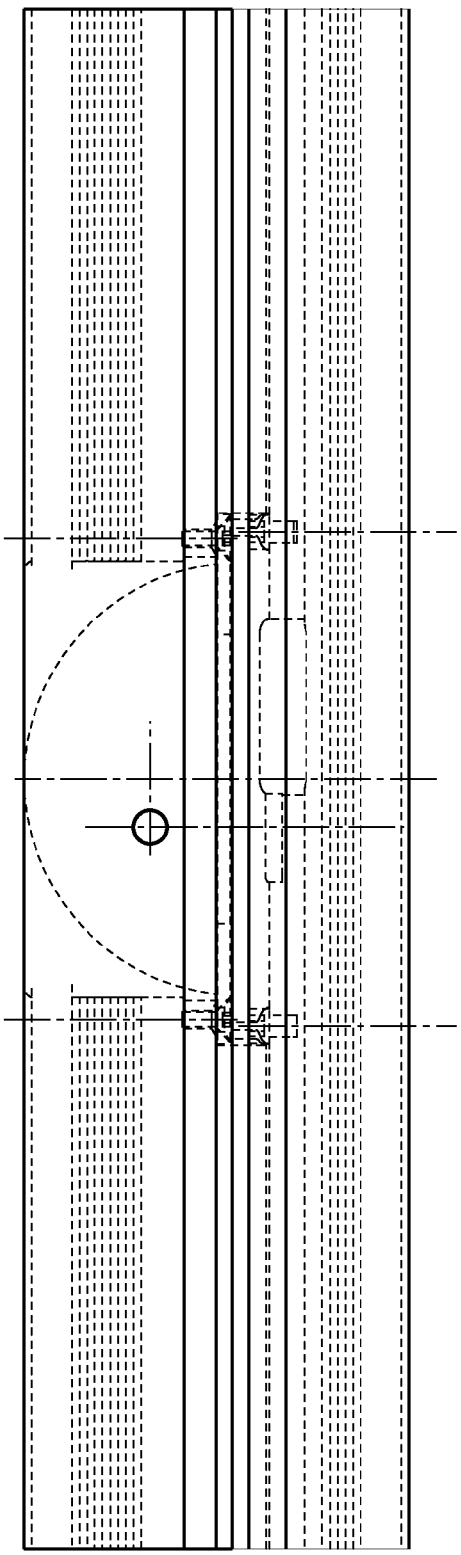
FIG. 6 is a top view of a portion of the frame for a portable floor made in accordance with the current disclosure.
Figure 7:
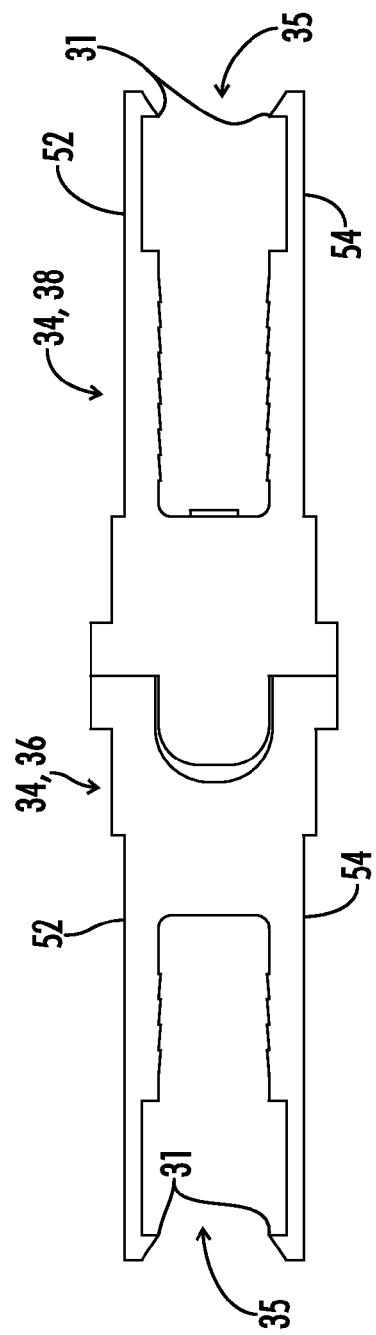
FIG. 7 is a side end view of FIG. 6 view showing the male and female sides of the frame engaged.
Figure 8A:
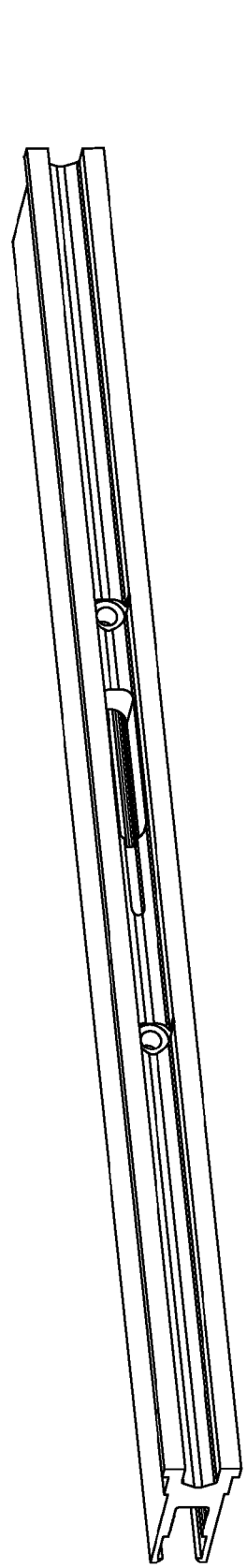
FIG. 8A is a top perspective view showing a female side of the frame.
Figure 8B:
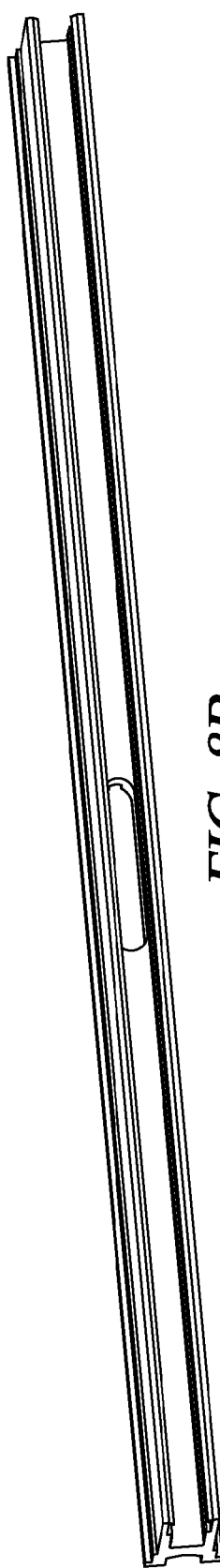
FIG. 8B is bottom perspective view showing a female side of the frame.
Figure 9:
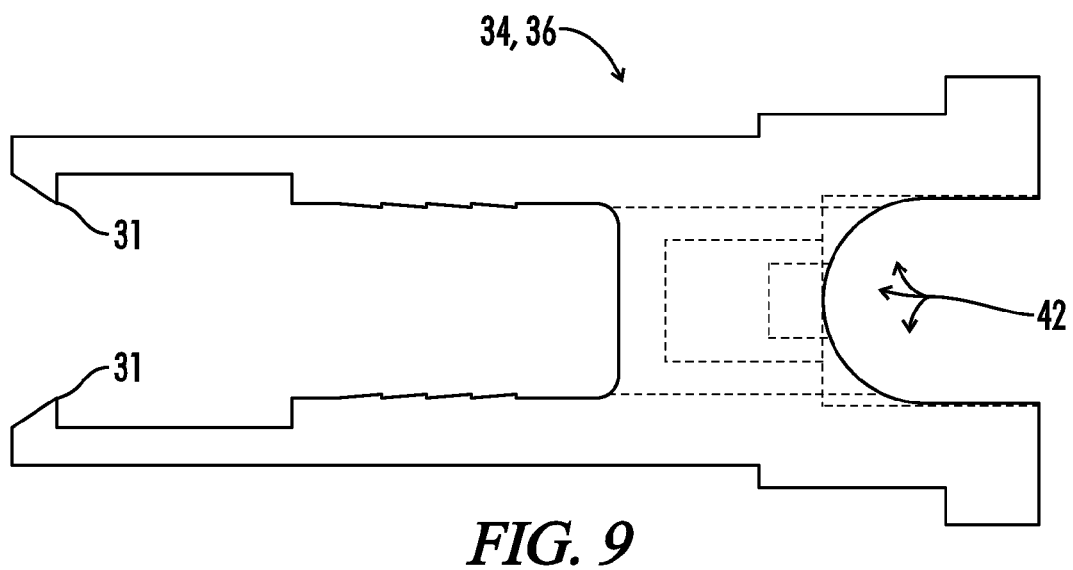
FIG. 9 is a side end view of the female side of the frame.
Figure 10A:
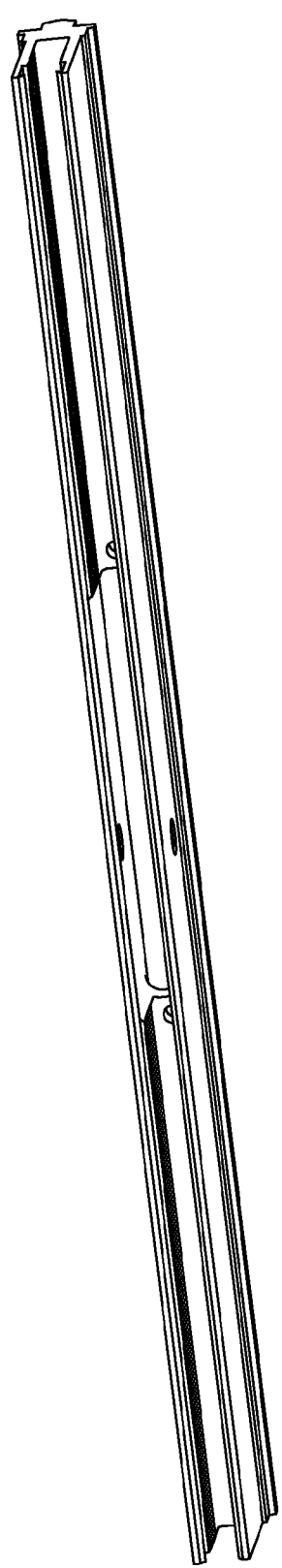
FIG. 10A is a bottom perspective view showing a male side of the frame.
Figure 10B:
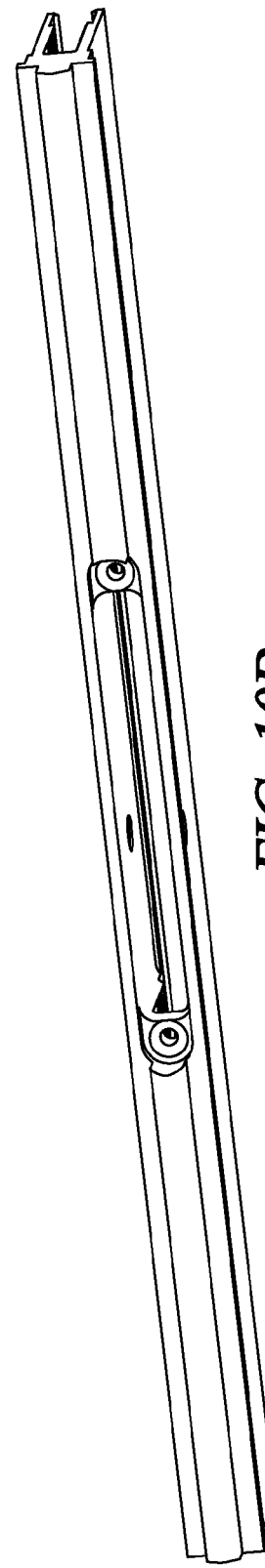
FIG. 10B is a top perspective view showing a male side of the frame
Figure 11:
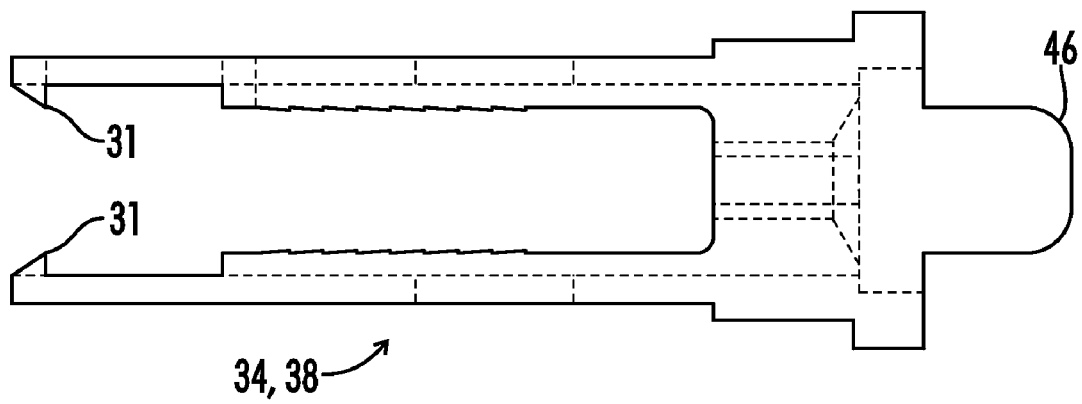
FIG. 11 is a side end view of the male side of the frame.
Figure 12A:
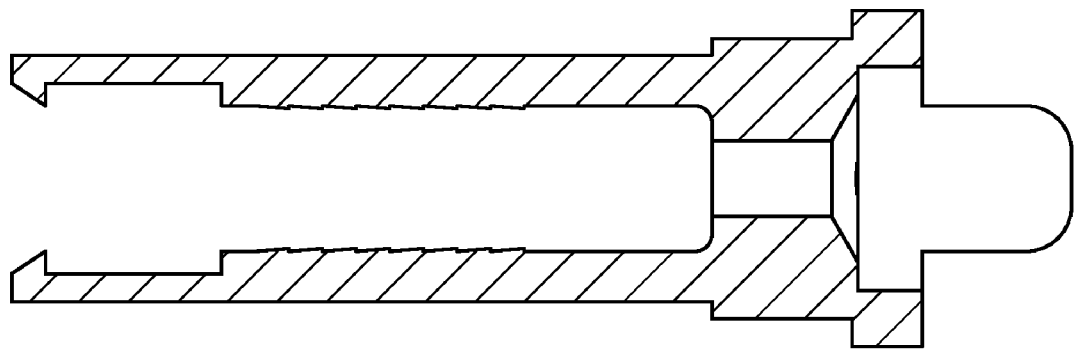
FIG. 12A is a cross-sectional view of the male portion shown in FIG. 11.
Figure 12B:
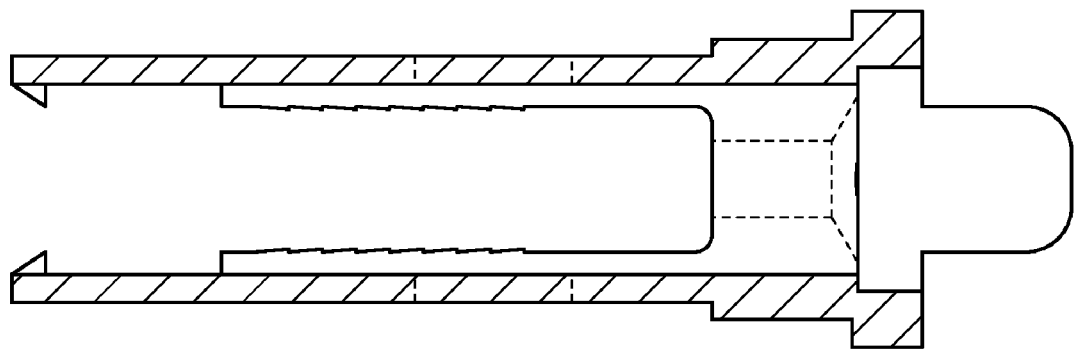
FIG. 12B is an alternate cross-sectional view of the male portion shown in FIG. 11.

In a preferred embodiment the frame is composed of metal, such as aluminum, but can also be constructed of polymers. The protrusion 46 of one of the panels 32 is positioned to engage the channel 42 of an adjacent panel 32 to restrict movement of the panels in relation to one another. The engagement between the protrusion 46 and channel 42 preferably restricts both rotational and vertical movement of the panels in relation to one another. This can best be illustrated by FIG. 7 and FIGS. 2-3 showing engaged and disengaged embodiments of the male and female sides 36 and 38 of the frame 34.

The frame 34 is designed with panel gaps 35 spaced to accept the core. The fiber layers, polyurethane layers and skins are all placed over the frame on the external surfaces 52 and 54 to increase the bonding and engagement between the frame pieces 34. The external surfaces opposite 52 and 54 also get a fiber layer, polyurethane, and a skin.

The locking element 48 preferably includes a rotatable hook 56 that engages the extrusion of the female side or part 36. Fasteners such as screws 58 can hold in the hook or lock 56. This hook further facilitates the engagement between adjacent panels 32 during on-site assembly of the portable floor 30 and their disengagement upon disassembly of the floor after use. To engage the extrusion the hook 56 is rotated, for example using a known device such as an Allen wrench, inserted into hole 57. Correspondingly, the female side 36 includes engaging aperture 41 into which the locking element 48 engages to secure adjacent panels 32.

The floor panels 32 can also be constructed to include an alignment/lateral movement suppression system. The system comprises a gap in the protrusion 46 where the locking element 56 is located. This gap is used as a guide to mate to two pegs 62, which can be cap head screws, located in the female side 36. As such, corresponding floor panels 32 are aligned to establish a portable floor 30 that will be secure.

The extrusion incorporates at least one tooth 31 running the length of the extrusion on both sides of the channel 35. This tooth 31 is compressed so as to bite into the core to secure the frame to the core.

Figure 15:
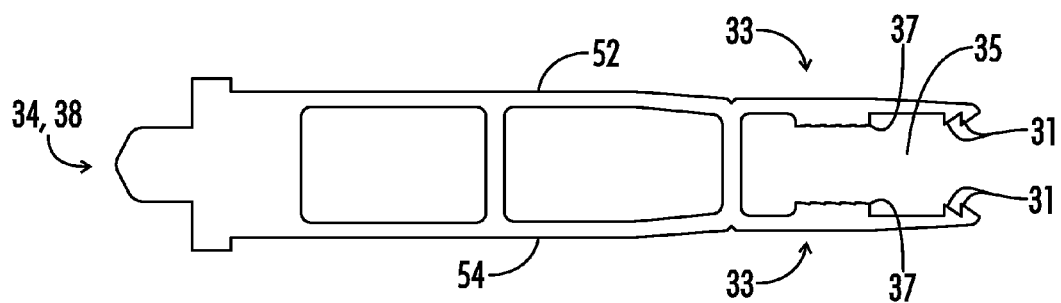
FIG. 15 is a side end view of a male side of the frame.
Figure 16:
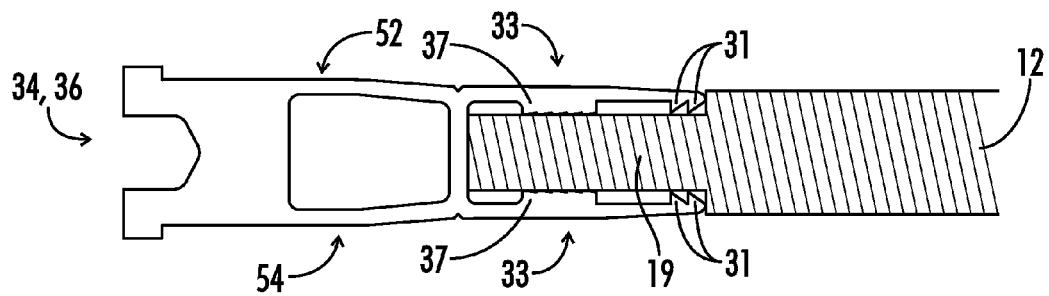
FIG. 16 is a side partial cross-section view showing a female side of the frame with a portion of the core positioned in the channel.
Figure 17:
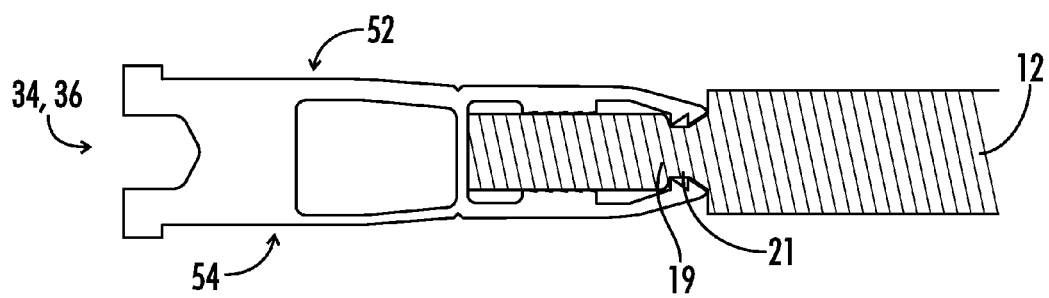
FIG. 17 is a side partial cross-section showing a female side of the frame with a portion of the frame compressed around the perimeter section of the core.
Figure 20A:
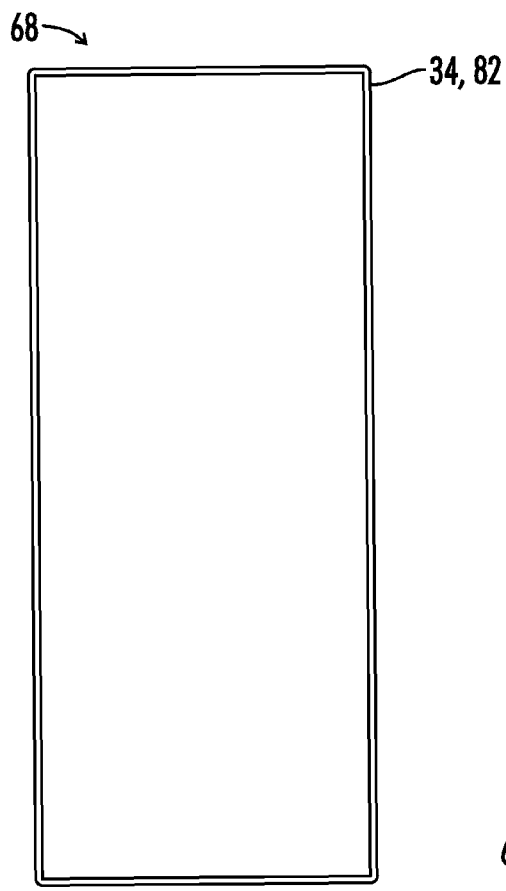
FIG. 20A is a top view of a table top made in accordance with the current disclosure.
Figure 20B:
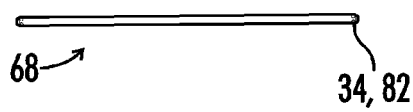
FIG. 20B is an end view of the table top show in 20A.
Figure 20C:
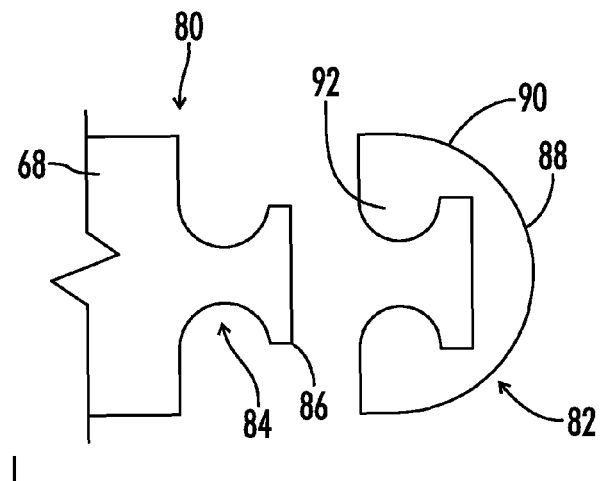
FIG. 20C is a detailed exploded end view of a frame and pinched edge on the table shown in 20A-B.
Figure 21A:
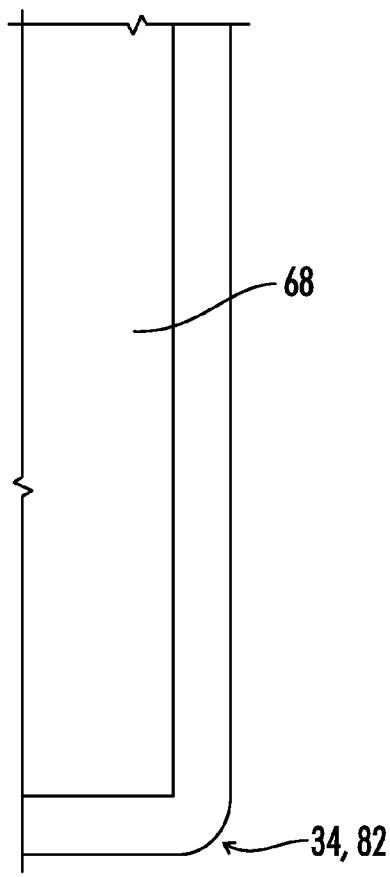
FIG. 21A is a partial top view of a table top made in accordance with the current disclosure.
Figure 21B:
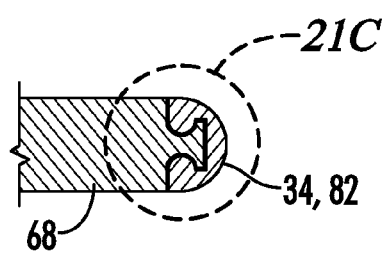
FIG. 21B is a cross-sectional view of the table top show in 21A.
Figure 21C:
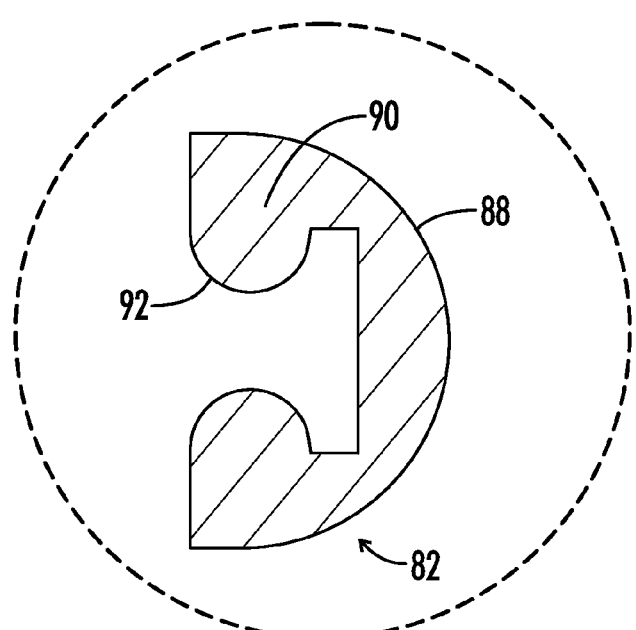
FIG. 21C is a detailed exploded end view of a pinched edge on the table shown in 21A-B.

As illustrated in FIGS. 15-17, multiple teeth 31 can extend inwardly from the sides, or projections 33, of the channel 35 to engage the core 12. The projections can include stabilizers 37, also extending inwardly, to engage the core 12. The core can include a perimeter section 19 that includes a reduced thickness. The reduced thickness can be positioned in the channel 35 and the projections 33 can be forced, or compressed, inwardly. The compression of the projections 33 inward can further reduce a neck portion 21 of the perimeter section 19. The teeth 31 can extend into the neck portion 21 and engage the perimeter section 19 at the neck portion 21. This can result in a reduced thickness of the channel 35, corresponding generally to the location of the teeth 31, as compared to the rest of the channel 35. This facilitates the hold between the frame 34 and the core 12.

The engagement of the frame 34 to the core 12, through both the teeth 31 and the various layers and skins, and the engagement of the portions of the frame to each other for a given panel 10 provides an excellent resistance to deformation, including deformation by warping. This encapsulated frame, or extrusion, is designed strongly enough to overcome the bowing forces caused by expansion and retraction of the laminate and the adhesion is strong enough to maintain the integrity of the various layers.

Another example of a device incorporating one of the current inventive panels is a portable table 64. The portable table 64 includes support legs 66 and a planar surface 68 attached to the support legs 66. The planar surface 68 includes one of the panels 10 and a top exterior skin 70 and bottom exterior skin 72. The top skin 70 and bottom skin 72 can be specifically designed for use as a table and can include corresponding edges 74 and 76 that engage and can be sealed together.

The table 64 can also include support structures 78 that are substantially equal to the core length 13. The support structures 78 can provide additional rigidity to the table 64. Additional support structures, such as flat steel stock, 80 can be positioned in the core 12 between the polyurethane layers 20 and 22. These supports can be used to attach the hardware from the legs 66 to the planar surface 68.

The bottom skin 72 can have recessed areas 73 positioned to accept the support structure 78. This can also provide a handle area by which to carry the tables 64. The table 64 can be made in both circular and polygonal shapes, such as rectangular, square and the like. Alternately, the legs 66 can be attached to the planar surface 68 or table top 68 by metal inserts that are integral to the bottom skin 72.

As seen in FIGS. 19B-E, the table 64 can include recessions 75 that facilitate storage of the support legs 66 when the table 64 is not in use. The recession can "hide" the legs 66 to facilitate stacking of the tables. The legs 66 can still be visible, but the legs 66 can be positioned in a manner that allows the tables 64 to be stacked, for example 10-20 high. For example, the bottom side of the table 64 can be indented or crushed to accept the legs 66. More specifically, the bottom side of the core 12 can be indented making an impression where the legs 66 will fit when the table 64 is stacked and maintain the bottom of the table 64 substantially flat. The legs 66 can fit into the bottom of the table to result in a substantially coplanar arrangement with the planar surface of the table when folded. Alternately described, the legs and table can be substantially flush when the legs are folded into the table.

Figure 22A:
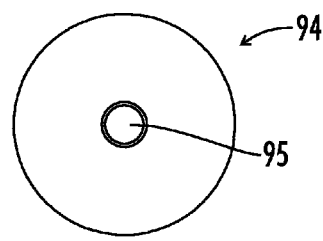
FIG. 22A is bottom view of an integral column connection in accordance with the current disclosure
Figure 22B:
FIG. 22B is a cross-sectional view of the column connection of FIG. 22A.
Figure 22C:
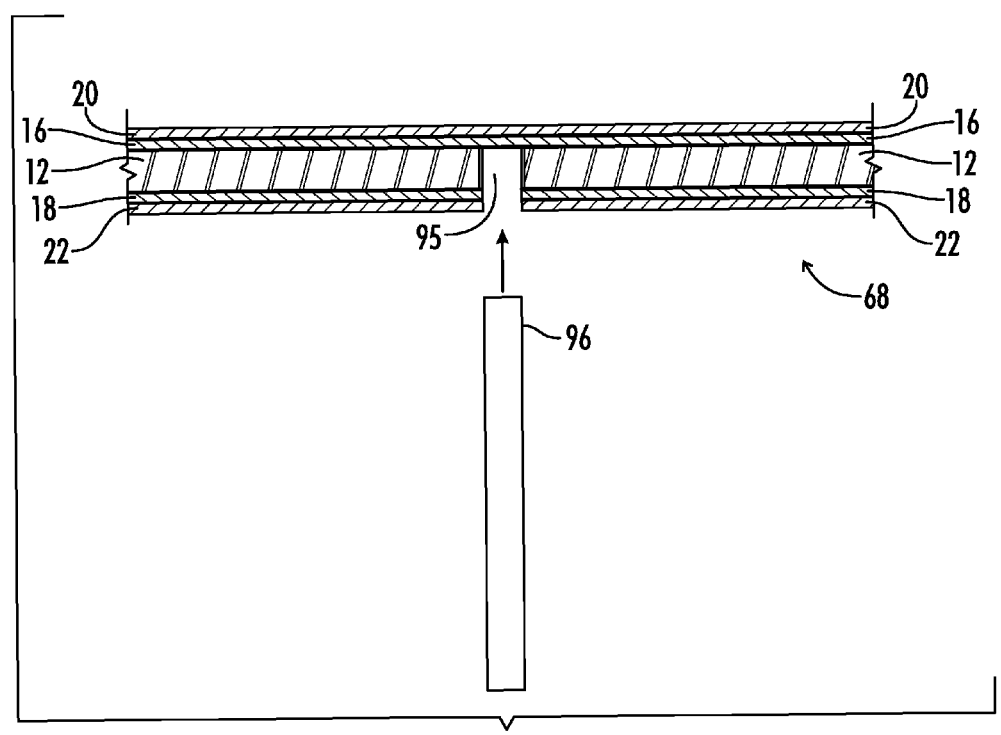
FIG. 22C is a cross-sectional view of a portion of core of a panel having an integral column connection mounted therein.

Additionally, a table that uses a column support rather than folding legs, such as a cocktail table, can be made according to the current disclosure. For such a table, the planar surface 68 with core 12 can be constructed generally as described above. As seen in FIGS. 22A-C, a column connection 94 can be placed integral to the core 12 of the planar surface 68 during the construction process. The column support 94 is shaped to accept the column 96 and removably secure the column 96 within the column support 94. This can be accomplished numerous ways, including an interference fit between the column 96 and the column support 94, threads on the column 96 operating with threads in the opening 95 of the column support 94, push button connections, ball and seat, tongue and grove connections, etc.

During the curing process the fiber layers 16 and 18 and polyurethane layers 20 and 22 harden to form a solid surface around the core 12 and column connection 94. The column connection 94 can then become a solid integral part of the core 12 and planar surface 68 and allow flush exterior surfaces. This is in contrast to typical prior art tables that have the connection for a column support protruding from the exterior surface of the table. The inventive connection allows the tables to be securely and compactly stacked.

As best seen in FIGS. 18A-21C, the table 64 includes a contoured edge 80 that cooperates with a frame, such as a cap 82, to provide a durable, yet light weight perimeter for the table 64. The contoured edge 80, which can be described as a pinched edge 80, is preferably formed as part of the perimeter of the core 12, fiber layers 16 and 18, and polyurethane layers 20 and 22. The contoured edge 80 includes a reduced thickness portion 84 that is smaller than the combined thickness of the core 12, fiber layers 16 and 18, and polyurethane layers 20 and 22. An intermediate thickness portion 86 extends from the reduced thickness portion 84 opposite the body portion of the core 12. The contoured edge 80 can be described as having a neck and a head extending from the neck. Alternate shapes are possible for the contoured edge 80 with an important characteristic being the facilitation of the mechanical attachment between the core and the cap 82. For example, a cross-section of the contoured edge 80 can generally look "T-shaped", as shown in the figures.

The cap 82 can include a concave shape designed to accept and hold the contoured edge 80. The cap can include projections 90 having extensions 92, or teeth 92, that can collectively form the concave shape. The cap 82 can include a rounded top 88 and is preferably composed of cast urethane material, but alternate suitable materials can be used. Skins 24 and 26 can be applied as previously discussed, but preferably before the addition of the cap 82 to the table 64.

The perimeter for the table 64 can be formed by using a press that will form the pinched edge 80 by squeezing the composite material, comprised of the core 12, fiber layers 16 and 18, and polyurethane layers 20 and 22, together. When the press closes, impressions from protrusions in the two halves of the press are forced into the composite material around the perimeter of the core. The resulting pinched edge 80 becomes a solid shape around the perimeter and provides a mechanical lock for the cap 82. Additionally, the cap 82 can be glued to the pinched edge core 80 for a reinforced attachment.

The combination of the pinched edge core 80 and the cap 82 provides improved impact resistance for the corners and edges of the table 64. The resulting perimeter of the table 64 is solid, impact resistant to repeated drops, smooth, aesthetically pleasing, and connected to the panel portion of the table 64 in a way that it will not peel away.

Since the fiber layers 16 and 18 and polyurethane layers 20 and 22 harden to form a solid surface around the contoured edge 80, forces against the cap 82 are deflected and absorbed. Typical prior art composite honeycomb panels do not have a perimeter, or edge, designed for severe impact and have only a wrap around edge. The core of those prior art composite honeycomb panels are typically made of paper, aluminum or polypropylene and in of themselves do not provide any impact resistance. Nor do the skins of those prior art tables provide any impact resistance. Other manufacturers of composite panels rely on the edge material itself for impact resistance. Initial test on the inventive contoured edge 80 and cap 82 design confirmed that a panel made with this process can withstand impact drops. For example, tests showed that an inventive panel when dropped on its edge withstood over seven (7) direct corner impacts from a twenty-four (24) inch high drop without failure with a panel weighing under fifty pounds (in the test the panel weighed 42 pounds). This is a huge advantage over any other panels using a honeycomb type core.

Another benefit of the inventive contoured edge 80 and cap 82 design is in the manufacturing process itself. Previously, when a cast urethane edge was poured around panels made with a straight honeycomb edge, a seal, such as tape, had be placed all around the perimeter to avoid any openings where air could be entrained into the cast urethane, thus weakening the cast urethane. Also, typically honeycomb panel edges are inconsistent. As such, previously when there were openings or uneven surface edges on the honeycomb panels, excess urethane was used, and wasted, or the machine shot time was off and scrap material was produced. This increased the manufacturing time and cost of making a honeycomb panel with a urethane edge. With the inventive pinched edge 80, the tape process is generally eliminated and a consistent molded edge is realized.

Thus, although there have been described particular embodiments of the present invention of a new and useful New Portable Panel Construction and Method for Making the Same, it is not intended that such references be construed as limitations upon the scope of this invention except as set forth in the following claims.

What is claimed is:

1. A panel comprising:
   a core having a length, a width, a thickness, a perimeter section having a reduced thickness, a first side and a second side;
   a first fiber layer attached to the first side;
   a second fiber layer attached to the second side;
   a first polyurethane layer impregnating the first fiber layer;
   a second polyurethane layer impregnating the second fiber layer;

a first skin attached to the first polyurethane layer;
a second skin attached to the second polyurethane layer; and
a frame operatively engaging the core and including projections forming a channel shaped to accept the perimeter section, the projections shaped to mechanically engage the reduced thickness of the perimeter section.

2. The panel of claim 1, wherein the core further includes a plurality of openings, the opening substantially uniformly spaced along the width and length.

3. The panel of claim 1, wherein the frame includes a general T-shape and the projections and channel correspond to the T-shape.

4. The panel of claim 1, wherein each projection includes at least one tooth engaging the reduced thickness.

5. The panel of claim 4, wherein each projection includes an exterior surface and an external thickness measure between the exterior surfaces, the external thickness is reduced at a location corresponding to the location of the teeth on the projections.

6. The panel of claim 1, wherein the first skin and the second skin each include a metal layer.

7. A portable table, the portable table comprising
at least one support leg; and
a planar surface attached to the at least one support leg the planar surface including:
  a core having a length, a width, a first side and a second side;
  a first fiber layer attached to the first side;
  a second fiber layer attached to the second side;
  a first polyurethane layer impregnating the first fiber layer;
  a second polyurethane layer impregnating the second fiber layer;
  a first laminate skin attached to the first polyurethane layer;
  a second laminate skin attached to the second polyurethane layer;
  a thickness; and
  a perimeter section including a reduced thickness portion less than the thickness of the planar surface; and
a frame engaging the planar surface and including projections forming a channel shaped to accept the perimeter section, the projections shaped to mechanically engage the reduced thickness portion of the perimeter section.

8. The portable table of claim 7, wherein the perimeter section further includes an intermediate thickness portion extending from the reduced thickness portion opposite the body portion of the planar surface, the intermediate thickness portion larger than the reduced thickness portion and less than the thickness of the planar surface.

9. The portable table of claim 8, wherein the reduced thickness portion and the intermediate thickness portion of the perimeter section are mechanically pressed to a thickness less than the thickness of the planar surface.

10. The portable table of claim 7, further including a plurality of support structures positioned between the first and second laminate skins.

11. The portable table of claim 10, wherein at least one of the support structures includes a length substantially equal to the length of the core.

12. The portable table of claim 10, wherein the at least one support leg includes a polarity of foldable support legs with each foldable support leg attached to one of plurality of support structures.

13. The portable table of claim 10, wherein at least one of the support structures is positioned in the core between the first and second polyurethane layers.

14. The portable table of claim 7, further including a column and a column support shaped to accept and removable attche te column to the planar surface, the column support formed within the planar surface and positioned between the first and second fiber layers.

15. The portable table of claim 7, wherein the second skin is composed of a sound absorbing material.

16. The portable table of claim 7, wherein the planar surface includes an indented area shaped to accept the foldable support legs and position the foldable support legs substantially coplanar with the planar surface when the foldable support legs are closed.

17. A reversible portable floor, the portable floor comprising
a plurality of panels, each panel including:
  a core having a length, a width, a first side and a second side;
  a first fiber layer attached to the first side;
  a second fiber layer attached to the second side;
  a first polyurethane layer impregnating the first fiber layer;
  a second polyurethane layer impregnating the second fiber layer;
  a first skin attached to the first polyurethane layer;
  a second skin attached to the second polyurethane layer;
  a thickness;
  a perimeter section having a neck and a head; and
  a frame surrounding the core, the frame including projections forming a channel shaped to accept the perimeter section, the projections shaped to mechanically engage the head and neck of the perimeter section.

18. The reversible portable floor of claim 17, wherein each projection of the frame includes at least one tooth engaging the neck of the perimeter section.

19. The reversible portable floor of claim 18, wherein each projection of the frame further includes at least one stabilizer engaging the head of the perimeter section.

20. The reversible portable floor of claim 17, further including a metal portion extending substantially the width and length of the core.

21. A method of constructing a panel comprising:
a) providing a frame having a projections forming a channel
b) providing a core having thickness and a perimeter with a reduce thickness
c) placing the perimeter of the core within the channel of the frame and compressing the projections of the frame into engagement with the perimeter of the core;
d) attaching a first fiber layer to a first side of the core and a first side of the frame;
e) attaching a second fiber layer to a second side of the core and a second side of the frame;
f) impregnating a first polyurethane layer in the first fiber layer;
g) attaching a first skin to the first polyurethane layer and the frame, the first skin and frame constraining the first polyurethane layer as it cures;
h) impregnating a second polyurethane layer in the second fiber layer; and
i) attaching a second skin to the second polyurethane layer and the frame, the second skin and frame constraining the second polyurethane layer as it cures.

22. The method of claim 21, wherein the method is performed without a mold.

23. A method of constructing a portable table comprising:
a) providing a planer surface, the planar surface having
a core having first and second fiber layers attached to first and second sides of the core, first and second polyurethane layers impregnated to one of the first or second fiber layers, first and second skins attached to one of the first or polyurethane layers, the core fiber layers, polyurethane layers and skins forming a planar surface body thickness;
b) compressing a portion of the planar surface to form a perimeter having a thickness less than the planar surface body thickness; and
c) forming a frame around the planar surface, the frame mechanically engaging the perimeter of the planar surface.

24. The method of claim 23, wherein the perimeter is formed with at least two distinct thicknesses with each thickness less than the planar surface body thickness.

* * * * *

UNITED STATES PATENT AND TRADEMARK OFFICE
CERTIFICATE OF CORRECTION

PATENT NO. : 7,748,196 B2  Page 1 of 1
APPLICATION NO. : 12/419127
DATED : July 6, 2010
INVENTOR(S) : George Gula It is certified that error appears in the above-identified patent and that said Letters Patent is hereby corrected as shown below:

Column 12, Lines 4-8 should read

14. The portable table of claim 7, further including a column and a column support shaped to accept and removably attach the column to the planar surface, the column support formed within the planar surface and positioned between the first and second fiber layers.

Signed and Sealed this

Twelfth Day of October, 2010

David J. Kappos
*Director of the United States Patent and Trademark Office*